(12) United States Patent
Huang et al.

(10) Patent No.: US 7,634,767 B2
(45) Date of Patent: Dec. 15, 2009

(54) METHOD AND SYSTEM FOR ASSIGNING REGISTER CLASS THROUGH EFFICIENT DATAFLOW ANALYSIS

(75) Inventors: Bo Huang, Shanghai (CN); Jinquan Dai, Shanghai (CN); Cotton Seed, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 10/813,764

(22) Filed: Mar. 31, 2004

(65) Prior Publication Data

US 2005/0229169 A1  Oct. 13, 2005

(51) Int. Cl.
*G06F 9/45* (2006.01)

(52) U.S. Cl. ............ 717/151; 717/150; 717/152; 717/154; 717/155

(58) Field of Classification Search .......... 717/140–161
See application file for complete search history.

(56) References Cited

U.S. PATENT DOCUMENTS

| 4,961,141 | A * | 10/1990 | Hopkins et al. ............ 717/151 |
| 5,530,866 | A * | 6/1996 | Koblenz et al. ............ 717/144 |
| 6,305,014 | B1 * | 10/2001 | Roediger et al. ............ 717/154 |
| 2002/0095667 | A1 * | 7/2002 | Archambault ............... 717/154 |
| 2004/0255279 | A1 * | 12/2004 | Rawsthorne et al. ........ 717/136 |
| 2005/0102658 | A1 * | 5/2005 | Li et al. ...................... 717/140 |

FOREIGN PATENT DOCUMENTS

EP  0 373 361 A  6/1990

OTHER PUBLICATIONS

Hirnschrott et al., "Graph Cooring vs. Optimal Register Allocation for Optimizing Compilers," Springer, Oct. 22, 2003.*
Beatty, Register assignment algorithm for generation of highly optimized object code, IBM, 1974.*
Scholz et al., "Register Allocation for Irregular Architectures," ACM, 2002.*
Huang et al., "Loop Transformations for Architectures with Partitioned Register Banks," ACM, 2001.*
Kolson et al., "Optimal Register Assignment to Loops for Embedded Code Generation," ACM, 1996.*
Auslander et al., "Fast, Effective Dynamic Compilation," ACM, p. 149-159, 1996.*

(Continued)

*Primary Examiner*—Insun Kang
(74) *Attorney, Agent, or Firm*—Blakely, Sokoloff, Taylor & Zafman LLP (57) ABSTRACT

A method is presented including assigning a first register class to at least one symbolic register in at least one instruction, determining and assigning a second register class to the at least one register, reducing register class fixups and renaming the at least one symbolic register. Also presented is a system including a processor having at least one register and a compiler executing in the processor that inputs a source program having many operation blocks. The compiler assigns a first register class in at least one instruction to at least one symbolic register, determines and assigns a second register class to the at least one symbolic register, reduces register class fixups, and renames the at least one symbolic register.

15 Claims, 8 Drawing Sheets

OTHER PUBLICATIONS

Moon et al., "Evaluation of predicated array data-flow analysis for automatic parallelization," ACM, 1999.*

Esparza et al., "Efficient algorithms for pre* and post* on interprocedural parallel flow graphs," ACM, 2000.*

Bergamaschi et al., "Data-Path Synthesis Using Path Analysis," ACM, 1991.*

Jung, S., Paek, Y.: "The Very Portable Optimizer for Digital Signal Processors", International Conference on Compilers, Architecture and Synthesis for Embedded Systems Nov. 16, 2001.

Liem, C., et al.: "Register Assignment Through Resource Classification for ASIP Microcode Generation", IEEE/ACM International Conference on Computer Aided Design, San Jose Nov. 6, 1994.

Notification of Transmittal of International Preliminary Examination Report, International Application No. PCT/US2005/010712, Aug. 16, 2005.

Translation of First Office Action mailed Nov. 30, 2007 for Chinese Patent Application No. 200580010377.4 (PCT/US2005/010712).

Translation of Second Office Action mailed May 30, 2008 for Chinese Patent Application No. 200580010377.4 (PCT/US2005/010712).

* cited by examiner alu[ dest, A_op, alu_op, B_op]

(ALU instruction)

Fig. 1A    PRIOR ART

A_Op and B_Op are symbolic registers, the following are possible register class assignment pairs to A_Op and B_Op:

| A_Op | B_Op |
|---|---|
| General Purpose Register (GPR) (A Bank) | GPR (B Bank) |
| GPR (B Bank) | GPR (A Bank) |
| Transfer In (SRAM (S) or DRAM (D)) | GPR (A Bank or B Bank) |
| GPR (A Bank or B Bank) | Transfer In (S) or (D) |

(Possible register class assignment to A_Op and B_Op)

Fig. 1B

PRIOR ART

Dest ← Src_1 Op Src_2

(Intermediate Representation of Target Machine Instruction)

Fig. 2

$$M = \{(s_i, c_{s_i}) \mid 1 \leq i \leq N_s; c_{s_i} \text{ equals either } C_k (1 \leq k \leq m) \text{ or } C\}$$

Definition of Register Class Assignment Map

For each basic block $B_j$

For each instruction i inside $B_j$ from block entry to block exit         For each operant O of i             If O is a symbolic register $s_k$                 If $s_k$ requires specific register class assignment in i                     Regclass $(s_k, i) = C_n$, where $C_n$ is the specific register class required by i;

Else                     Regclass $(s_k, i) = C$;

```
OUT_M(i)=IN_M(i);
for each symbolic register operand s_k of instruction i (Suppose s_k is the Nth operand)
    Find out the value of PrevAssign where (s_k PrevAssign) ∈ OUT_M(i);
    CurAssign = Regclass (s_k, i);
    if (CurAssign = =C)
            if (PrevAssign! =C)
                    if (IsValidRegClassAssignment (i, Nth, PrevAssign))
                            Regclass(s_k i)=PrevAssign;
                            continue;        /*continue the next loop iteration */
                    else
                            CurAssign=GetNextRegClass(Inst, NthOperand);
                            If (s_k is not the destination operand)
                                    Insert before i the register class fixup from PrevAssign to CurAssign;
                    else
                            CurAssign =GetNextRegClass(Inst, NthOperand);
                    Regclass (s_k, i) =CurAssign;
                    Replace (s_k PrevAssign) with (s_k CurAssign) in OUT_M(i);
    else
            if ((s_k, CurAssign) ∉ OUT_M(i))
                    if (PrevAssign!=C AND s_k is not the destination operand)
                            insert before i the register class fixup from PrevAssign to CurAssign;
                    Replace (s_k PrevAssign) with (s_k CurAssign) in OUT_M(i);
```

Fig. 7

For each basic block b based on the topological order of the dataflow graph
   Calculate IN_M(b);
   for each instruction i inside basic block b from entry to exit
      Calculate IN_M(i);
      Calculate OUT_M(i));
   Calculate OUT_M(b);

Fig. 8

Fig. 9A (Hoisting)

Fig. 9B (Sinking)

METHOD AND SYSTEM FOR ASSIGNING REGISTER CLASS THROUGH EFFICIENT DATAFLOW ANALYSIS

BACKGROUND

1. Field

The embodiments relate to compiler technology, and more particularly to compiler optimization through register class assignment.

2. Description of the Related Art

When designing and implementing compilers, register allocation and register assignment are very important in increasing a computer program's efficiency. Register allocation determines the program values that should be stored in a machine's (e.g., a computer system) registers at each program point instead of being stored in the memory. Register assignment determines which register each allocated program value should be located. Compiler developers sometimes ignore register class assignment. The reason why register class assignment is usually ignored is because most machines contain very few register classes. Typically, most machines only have two sorts of registers: integer and floating-point registers.

For those machines having two register classes (i.e., integer and floating point), each register operand of an instruction requires a fixed register class, i.e. the register class assignment is explicitly performed during the instruction set architecture (ISA) design. In view of modern computer architecture design, however, register class assignment becomes increasingly difficult to determine. For example, in some advanced processors abundant register classes are available. And, an instruction register operand is allowed to be assigned with a physical register in different register classes.

Figure 1A:
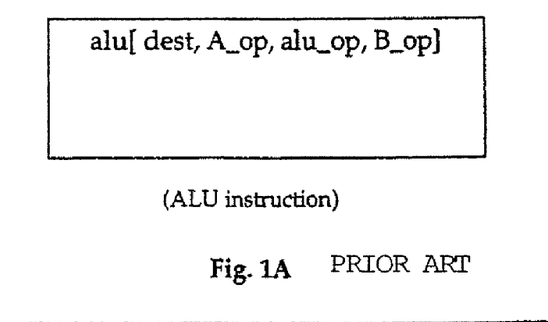
FIG. 1A illustrates an example of an ALU instruction.
Figure 1B:
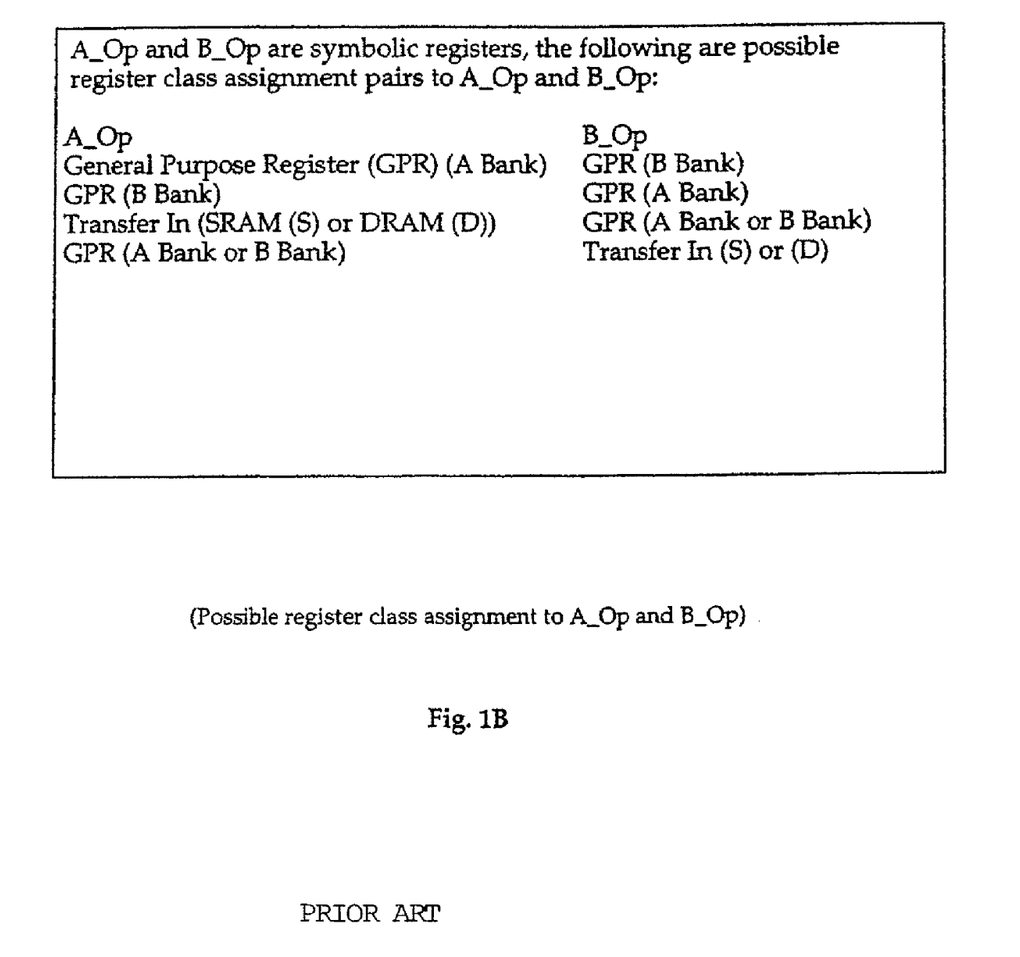
FIG. 1B illustrates an example of possible register class assignment to the two symbolic registers in the instruction described in FIG. 1A.

To make the problem more complicated, the register class assignment can not be performed randomly. Only specified register classes can be applied to a register operand for a specified instruction. FIGS. 1A and 1B illustrate an example that demonstrates flexible register class assignment to an arithmetic logical unit (ALU) instruction. FIG. 1A illustrates an example of an ALU instruction. FIG. 1B illustrates an example of possible register class assignment to symbolic registers A_OP and B_OP. This kind of complexity makes the compiler design and implementation more and more challenging.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

The Embodiments discussed herein generally relate to a method and system for assigning register class through efficient dataflow analysis. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 2:
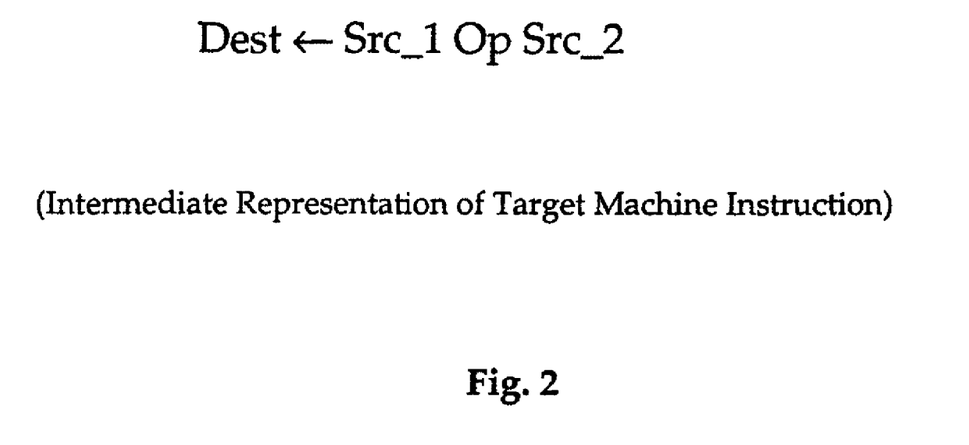
FIG. 2 illustrates an intermediate representation of a target machine instruction.

In the case where a target machine has m register classes $C_1, C_2, \ldots C_m$, each register class $C_1$ contains $N_i$ physical registers (i.e. $N_i = |C_i|$). In addition, the intermediate representation of each instruction of target machine looks like the format depicted in FIG. 2, in which Dest, Src_1 and Src_2 might be symbolic registers. In one embodiment by, using an efficient dataflow analysis for each compilation unit (function), assignment of a register class to each symbolic register is included in each instruction.

In another embodiment, for a symbolic register s to be included in an instruction i, if register class $C_k$ is assigned to s in i, the information of register class assignment is represented as RegClass (s, i)=$C_k$ and symbolized as s:$C_k$ in instruction i.

In one embodiment a Universal Register Class (the notation is simplified as C) is a pseudo register class that indicates the union of each register class from $C_1$ to $C_m$. A symbolic register can be assigned to C in a process where register class assignment is performed. It should be noted that sumbolic registers should be assigned with an actually existing register class ($C_1, C_2, \ldots C_m$) after the register class assignment process is completed. From the definition, the following two equations always hold for each i that satisfies $1 \leq i \leq m$.

$C_i \cap C = C_i$ $C_i \cup C = C$

In one embodiment a Register Class Array (the notation is simplified as A) is a constant array with $$\sum_{1 \leq i \leq m} N_i$$

elements, the value of each element is defined as follows:

$$A(i) = \begin{cases} C_1 (1 \leq i \leq N_1) \\ C_2 (N_1 + 1 \leq i \leq N_1 + N_2) \\ \cdots \\ C_m \left( \sum_{1 \leq j \leq m-1} N_j + 1 \leq i \leq \sum_{1 \leq j \leq m} N_j \right) \end{cases}$$

A global integer, A_Index, is used to iterate the array in the register class assignment process. In one embodiment, during the initialization portion of the assignment process, A_Index is initialized to 1.

Figure 3:
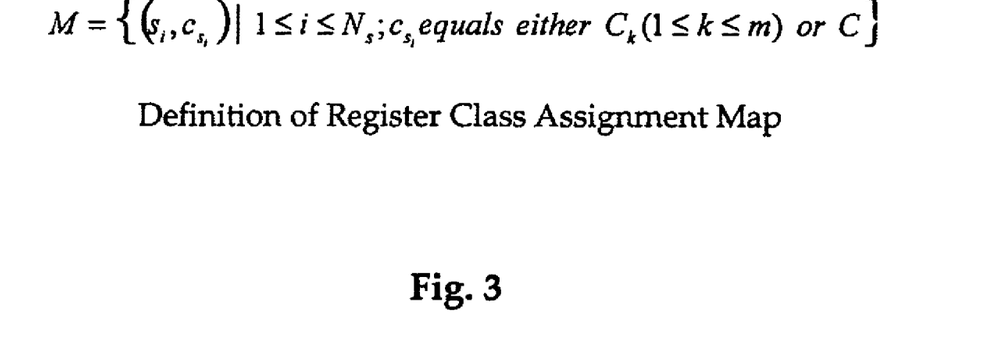
FIG. 3 illustrates the definition of the register class assignment map.

In one embodiment a Register Class Assignment Map (the notation is simplified as M) is a map used to track the register class assignment to each symbolic register. Each element of M has the form of (s, c), which means that register class c is assigned to the symbolic register s. Assuming that a compilation unit (function) contains $N_s$ symbolic registers, the register class assignment map that contains $N_s$ elements can be defined as illustrated in FIG. 3.

In one embodiment a Register Class Fixup is an instruction inserted to when register class assignments are modified. For example, if symbolic register s is first assigned with register class $C_1$ and in later analysis it is determined to assign s with $C_2$, then an additional instruction is added to move s:$C_1$ to s:$C_2$ (s:$C_2 \leftarrow$ s:$C_1$). The additional instruction move is called register class fixup from $C_1$ to $C_2$. In one embodiment register class fixup might be inserted either before one instruction or after one instruction, or both, providing that the semantic of the program is unchanged. Since more than one symbolic register might appear in one instruction, it's possible that several register class fixups are needed to accommodate the moves.

Figure 4:
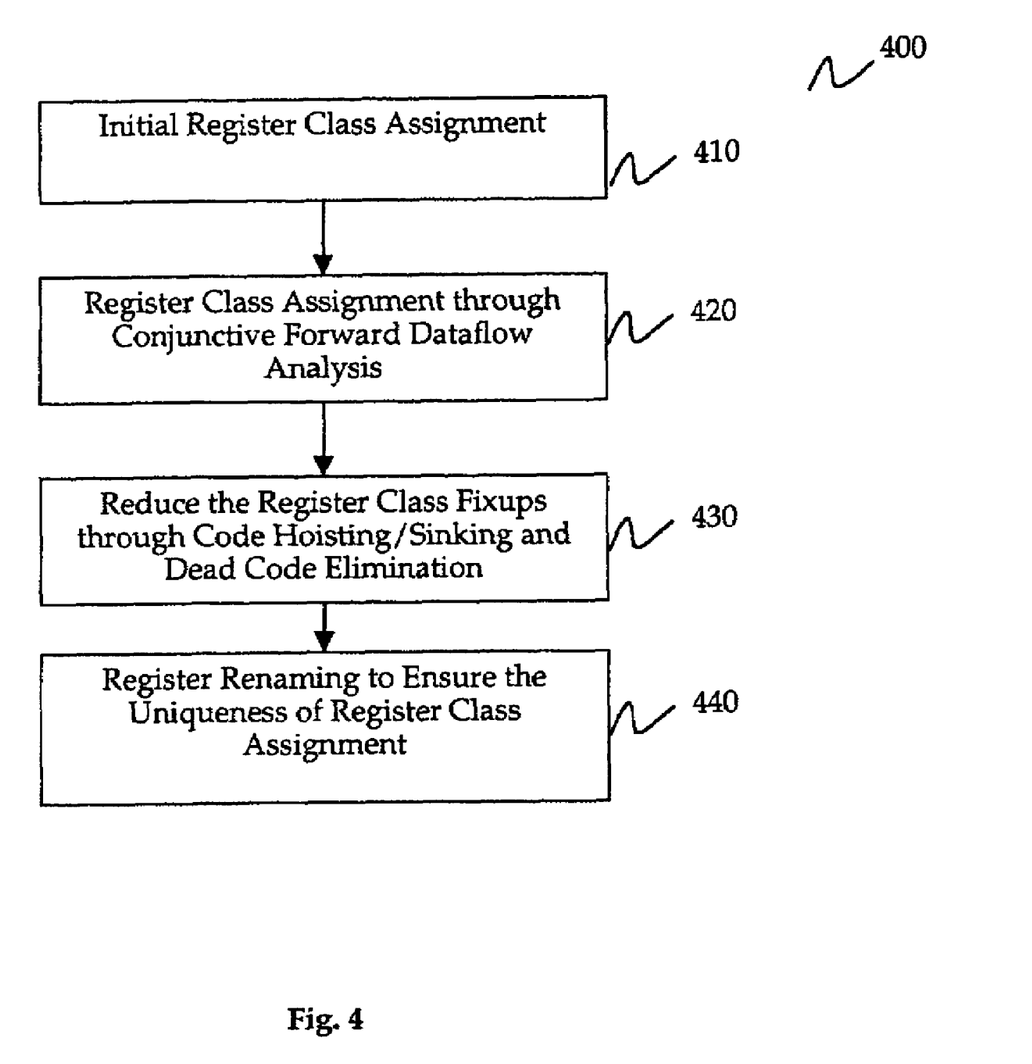
FIG. 4 illustrates a process of an embodiment for register class assignment.
Figure 5:
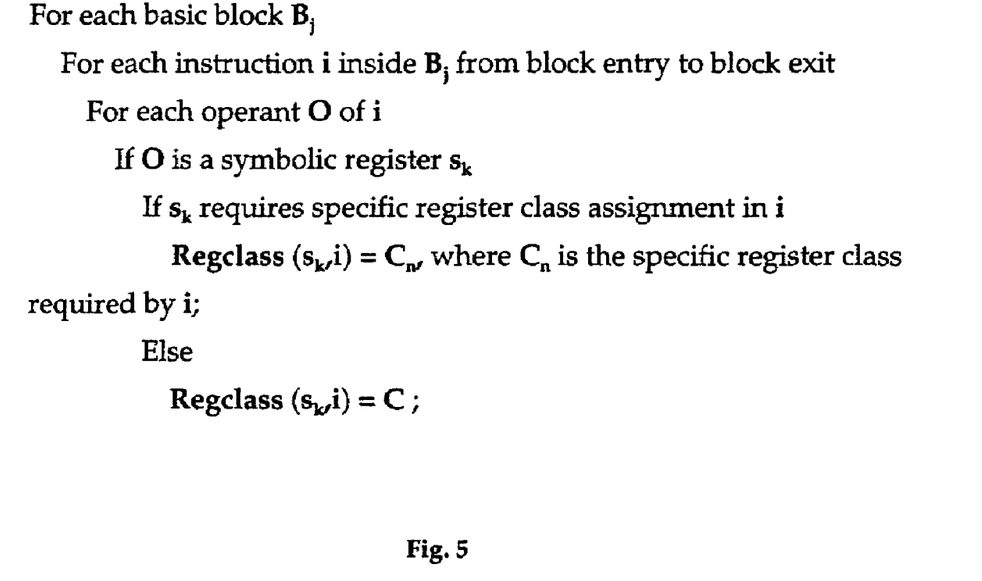
FIG. 5 illustrates pseudo code of an embodiment for initial register class assignment.

FIG. 4 illustrates a process of one embodiment where a register class is assigned to each symbolic register and the assignment is included in each instruction. Process 400 begins with block 410 where an initial register class assignment is made. For some instructions, it is required that only a specific register class can be assigned to the symbolic register operand that appears in those instructions (either destination operand or source operand). While for other symbolic registers that do not have such requirement, universal register class C is assigned to the symbolic register operand. FIG. 5 illustrates pseudo code of an algorithm included in one embodiment for initial register class assignment.

After block 410 is completed, process 400 continues with block 420. In block 420, register class assignment is performed through conjunctive forward dataflow analysis. For an arbitrary basic block b, the register class assignment map is assigned at the block entry as IN_M(b), while the register class assignment map at the block exit is assigned as OUT_M(b). The similar notion can be applied to an instruction, i.e., IN_M(i) and OUT_M(i), which are used to represent the register class assignment map at the entry of instruction i and at the exit of instruction i respectively. The following equations and algorithms are used to calculate OUT_M(b), IN_M(b), IN_M(i) and OUT_M(i). As for OUT_M(b), it can be calculated by using the following equation: OUT_M(b)= OUT_M(i), where i is the last instruction inside basic block b:

$$\text{IN\_M}(b) = \bigcap_{p \in Pred(b)} \text{OUT\_M}(p)$$

The "intersection" of register class assignment maps is defined as follows:

$$M_1 \cap M_2 \cap \ldots M_n = \{(s_i, c_{1si} \cap c_{2si} \cap \ldots \cap c_{nsi}) | 1 \leq i \leq N_s\}$$

Because $C_i \cap C = C_i$, if any $c_{ks}$ ($1 \leq k \leq n$) equals C, the "intersection" with it can be ignored. Based on this, the value of $c_{1si} \cap \ldots \cap c_{nsi}$ depends on those $c_{ksi}$ ($1 \leq k \leq n$) while $c_{ksi} \neq C$. If the number of $C_j$'s appearing in $c_{1si} \cap c_{2si} \cap \ldots \cap c_{nsi}$ is the largest one, the following equation holds in the algorithm $c_{1si} \cap c_{2si} \cap \ldots \cap c_{nsi} = C_j$. For example:

$$C_2 \cap C_5 \cap C_2 \cap C \cap C_3 = C_2 \cap C_5 \cap C_2 \cap C_3 = C_2$$

Figure 6:
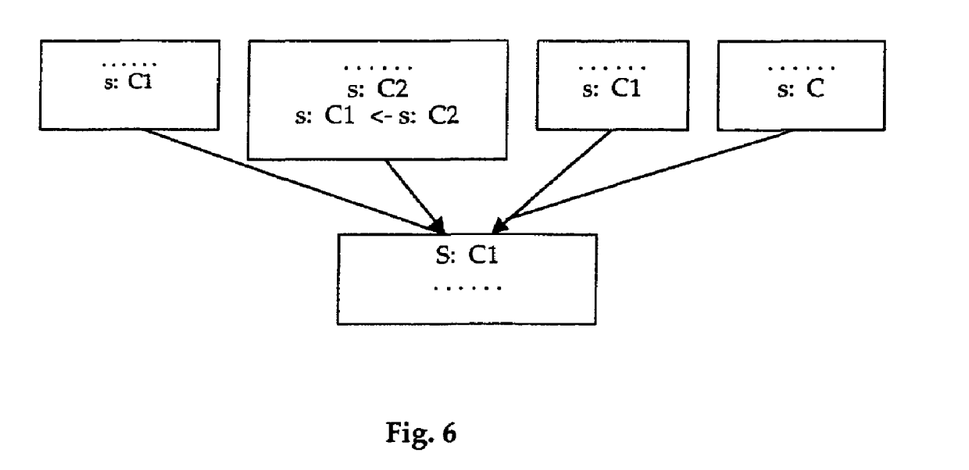
FIG. 6 illustrates an example of inter-block register class fixup of an embodiment.

If the appearance of each $C_j$ is the same in $c_{1si} \cap c_{2si} \cap \ldots \cap c_{nsi}$, then $c_{1si} \cap c_{2si} \cap \ldots \cap c_{nsi}$ equals to the first $C_j$ for the condition of $C_j \neq C$. This equation reflects the following principle: If different register classes are assigned to a symbolic register in a different path, then in the joint point it is more beneficial to choose the register class assignment that are valid in most paths ("register class fixup"). In one embodiment register class fixup is introduced at the end of each proceeding basic block where the register class assignment is different from the assignment in the joint point. If a symbolic register has been assigned with C in one proceeding basic block, register class fixup for that symbolic register is not necessary at the end of that basic block. FIG. 6 illustrates an example for inter-block register class fixup.

In one embodiment, if b has no proceeding basic block, i.e. b is the entry block of a compilation unit (function), then IN_M(b)=INIT_M, while INIT_M is a special register class assignment map where each symbolic register is assigned with C, the universal register class. IN_M(i)=OUT_M(p), where p is the proceeding instruction of i inside basic block b. If i is the first instruction of basic block b, then IN_M(i)= IN_M(b).

In one embodiment two function interfaces are used in the algorithm. The first function is "BOOL IsValidRegClassAssignment (Inst, NthOperand, RegClass)." This function returns TRUE if the register class assignment (RegClass) to the NthOperand of instruction Inst is valid. Otherwise, this function returns FALSE.

The second function interface is "REGISTERCLASS GetNextRegClass(Inst, NthOperand)." This function is used to find the correct register class assignment for the NthOperand of instruction Inst. In one embodiment pseudo code for GetNextRegClass is as follows:

while (TRUE)
  If(IsValidRegClassAssignment (Inst, NthOperand, A(A_Index)))
    break;
  Suppose A(A_Index) equals $C_j$, then reassign A_Index to be $$\left( \sum_{1 \leq i \leq j} N_i \right) \% \left( \sum_{1 \leq i \leq m} N_i \right) + 1$$

ReturnRegClass=A(A_Index);

$$A\_Index = \left(A\_Index \% \left(\sum_{1 \leq i \leq m} N_i\right)\right) + 1;$$

return ReturnRegClass.

It should be noted that because there must exist one register class that satisfies the register class assignment for the NthOperand of instruction Inst, the while loop won't become an infinite loop. Actually, the mechanism used to adjust A_Index can guarantee that no more than $N_i$ register classes are assigned to the adjacently used $N_i$ symbolic registers, which helps reduce the interferences in the future physical register assignment. According to the definition of Register Class Array A, assigining $(_{1 \leq i \leq j} N_i) \% (_{1 \leq i \leq m} N_i) + 1$ to A_Index can guarantee that $C_1$ will be the next register class assignment candidate after $C_m$.

Figure 7:
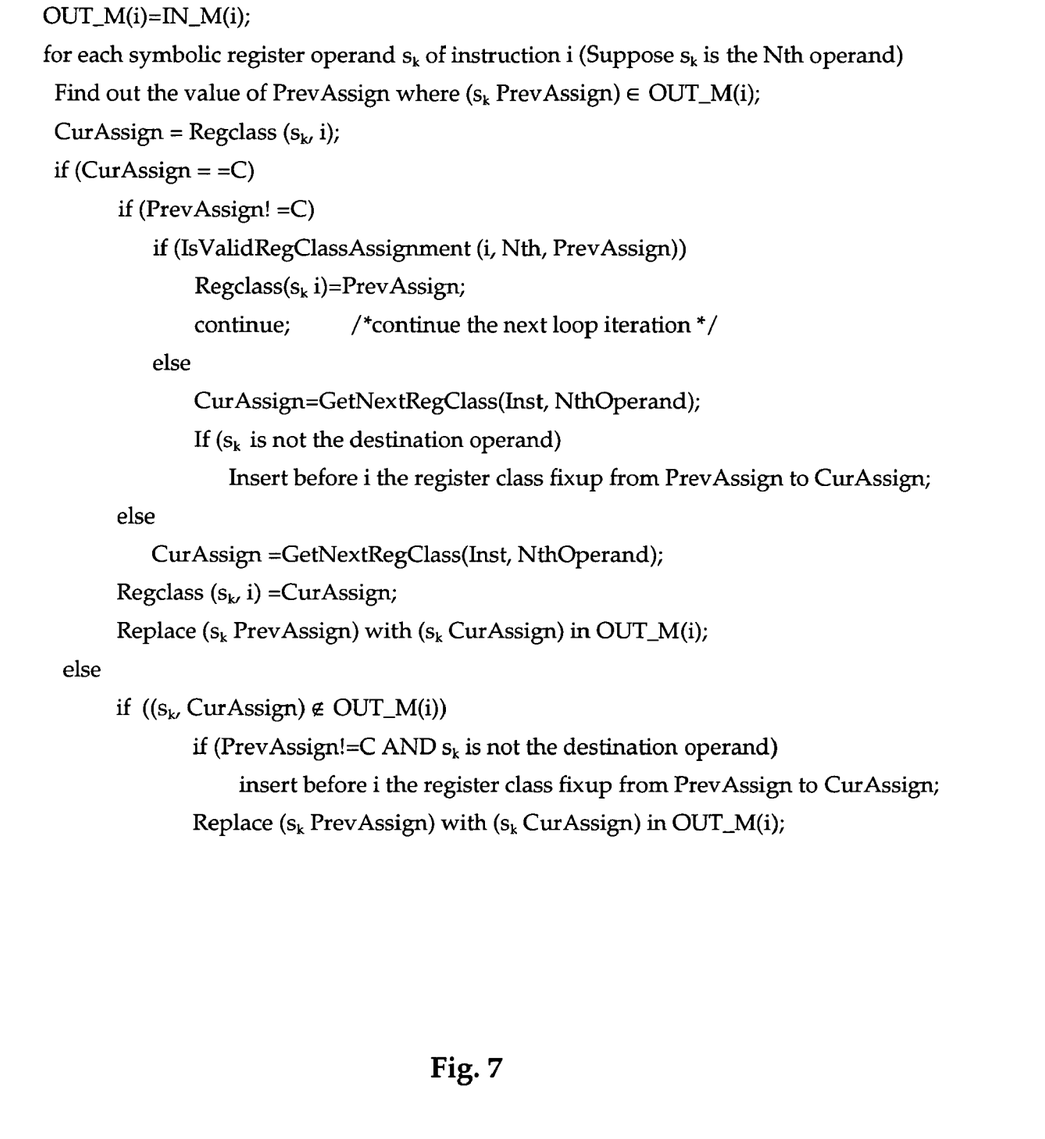
FIG. 7 illustrates pseudo code of an embodiment for calculating OUT_M(i).

FIG. 7 illustrates pseudo code of an algorithm used in one embodiment for calculating OUT_M(i). With the above data flow equations, a conjunctive forward dataflow analysis can be performed to calculate the register class assignment for each symbolic register inside each instruction. The dataflow analysis is efficient because each basic block is iterated only once.

Figure 8:
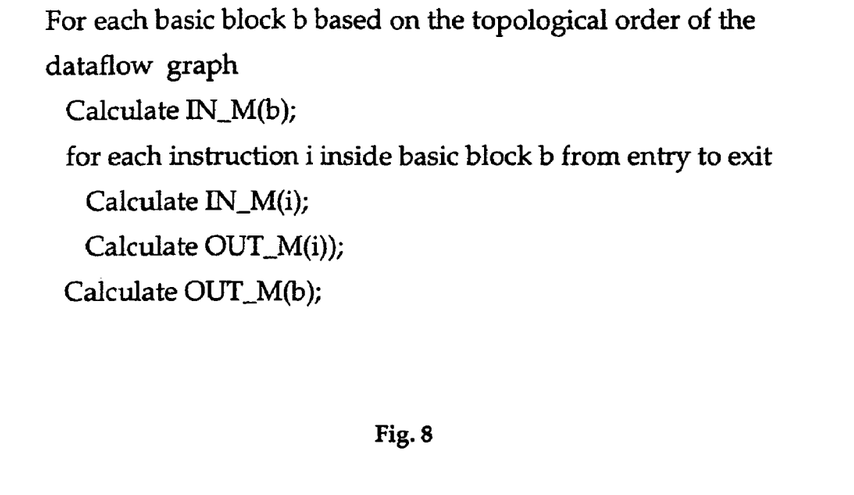
FIG. 8 illustrates pseudo code of an embodiment for a linear time dataflow framework.

FIG. 8 illustrates pseudo code for an algorithm for the linear time dataflow framework. During the process of constructing the topological order of the dataflow graph, algorithms should be used to break the strong connected component to make the topological sort applicable.

After block 420 is completed, process 400 continues with block 430. Block 430 reduces the register class fixups through code hoisting/sinking and dead code elimination. It should be noted that dead code elimination is a technique for improving the efficiency of a program by eliminating certain unnecessary code that may be either completely or partially dead. Completely dead code is code whose computed values are never used. Partially dead code has its computed values used along some paths but not others. Hoisting or lifting of the instruction to a different location may improve efficiency if the hoisting can be performed without executing additional instructions along any other path. Sinking or moving of instructions can improve efficiency if the sinking can be performed without executing additional instructions along any other path.

Figure 9A:
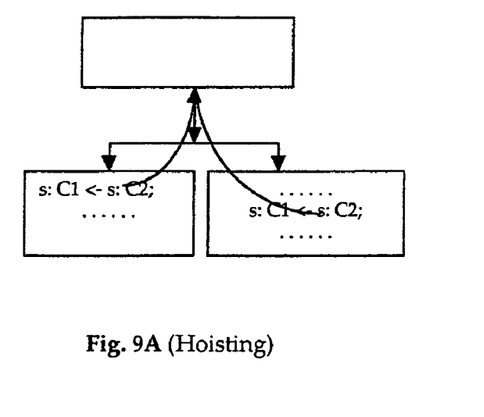
FIG. 9A illustrates an example of an embodiment for hosting register class fixups.
Figure 9B:
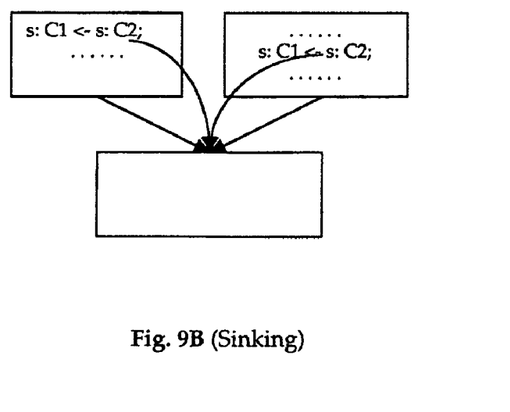
FIG. 9B illustrates an example of an embodiment for sinking register class fixups.

Because many register class fixups might be performed in block 420, the optimization of code hoisting/sinking can be performed to hoist/sink the fixups so that fewer register class fixups will be kept. FIG. 9A-B illustrates hoisting and sinking register class fixups. In one embodiment a dead code removal pass can be performed to remove unnecessary register class fixups. Using the case illustrated in FIG. 6 as an example, the fixup can be removed if the first appearance of s in the joint block is a destination operand.

Upon completion of block 430, process 400 continues with block 440. Block 440 performs register renaming to ensure the uniqueness of register class assignment. After block 430, a symbolic register might be assigned with various register classes in different instructions. To ensure that each symbolic register is assigned with only one register class, a register renaming pass is performed in block 440. For example, if a symbolic register is assigned with K different register classes, K different symbolic registers will be used instead, with each symbolic register being assigned with only one register class. Their corresponding appearances are replaced with the renamed symbolic registers.

By using the above described embodiments the problem of register class assignment is efficiently resolved. These embodiments provide a general framework for performing register class assignment through dataflow analysis. These embodiments are of particular benefit for modern processors having abundant register classes. The complete data flow analysis is a linear one because it iterates each basic block only once. Through using the register class array (A) and a process for adjusting the array index (A_Inder), the register class assignment algorithm achieves the result of having no more than $N_i$ register classes being assigned to the adjacently used $N_i$ symbolic registers. This helps reduce interferences in future physical register assignment.

Figure 10:
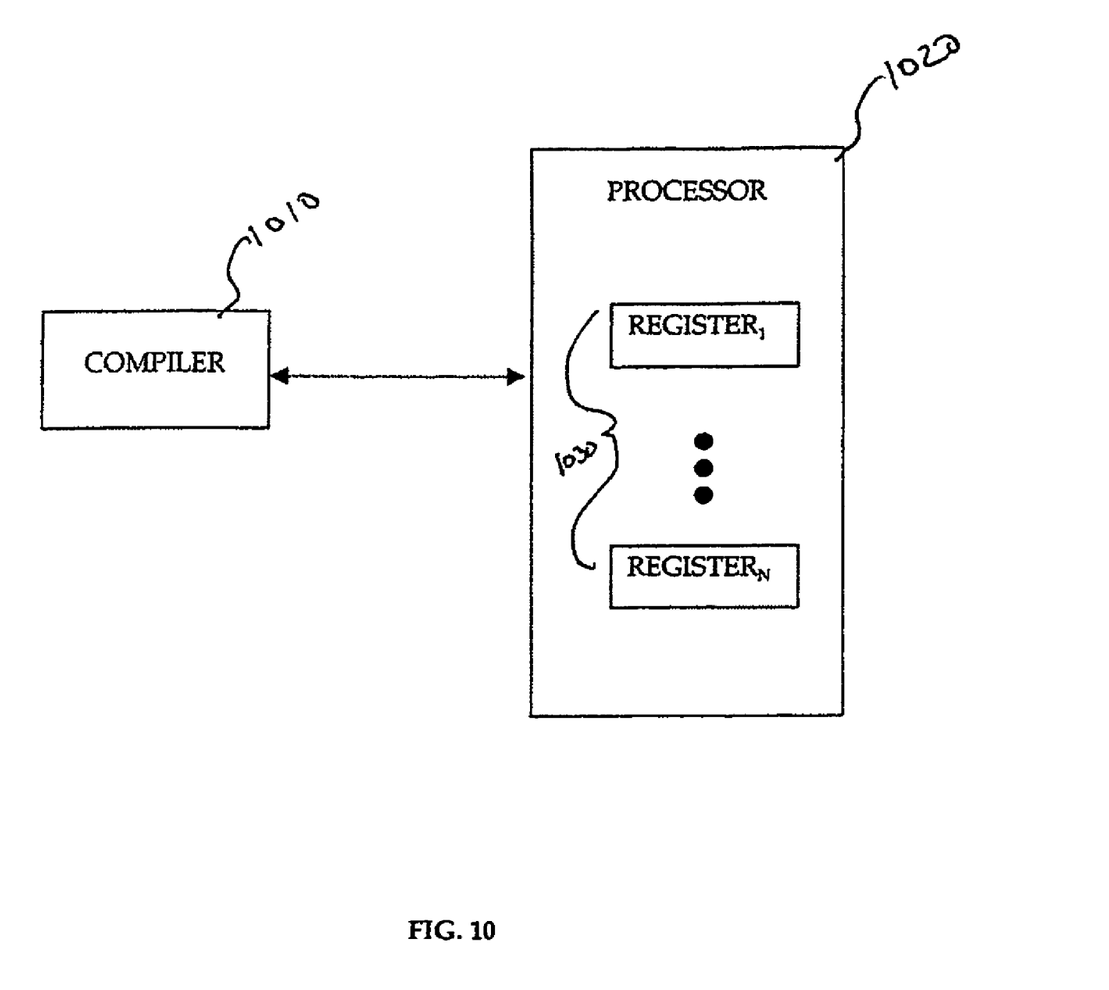
FIG. 10 illustrates a block diagram of a system of one embodiment.

FIG. 10 illustrates a block diagram of a compiler coupled to a processor for an embodiment having a register class assignment process according to the above-mentioned embodiments. In particular, FIG. 10 illustrates processor 1020, compiler 1010 and register set 1030. In one embodiment, compiler 1010 is a computer program on a machine (i.e., a compiler program) that can reside on a secondary storage medium (e.g., a hard drive on a machine) and is executed on processor 1020. Those of ordinary skill in the art will appreciate that other components can be coupled to processor 1020 (e.g., cache memory, local memory, memory controller, etc.), not shown in FIG. 10; only those parts necessary to describe the invention in an enabling manner are provided.

Processor 1020 has a number of registers ($R_1$-$R_N$) in register set 1030. In this embodiment, N can be 1 or more. Compiler 1010 is a compiler that can execute in processor 1020 in which a source program is inputted, causing compiler 1010 to generate an executable program, as is well known in the art. Compiler 1010 can also execute on a target machine as well. It is important to appreciate that the embodiments are not limited to any particular type of source program, as the type of computer programming languages used to write the source program may vary from procedural code type languages to object oriented languages. In one embodiment, the executable program is a set of assembly code instructions, as is well known in the art.

It should be noted that compiler 1010 can be run on either a host or target machine to generate executable code. The host and target machines can have different architectures. The compiled code can run on the host, target machine or other machines completely separate or networked. In one embodiment, while the compiler runs on the host machine, the compiled code is only run on a target machine. In one embodiment, the host and target machines are identical. In another embodiment, the host and target machines have different architectures from one another.

Figure 11:
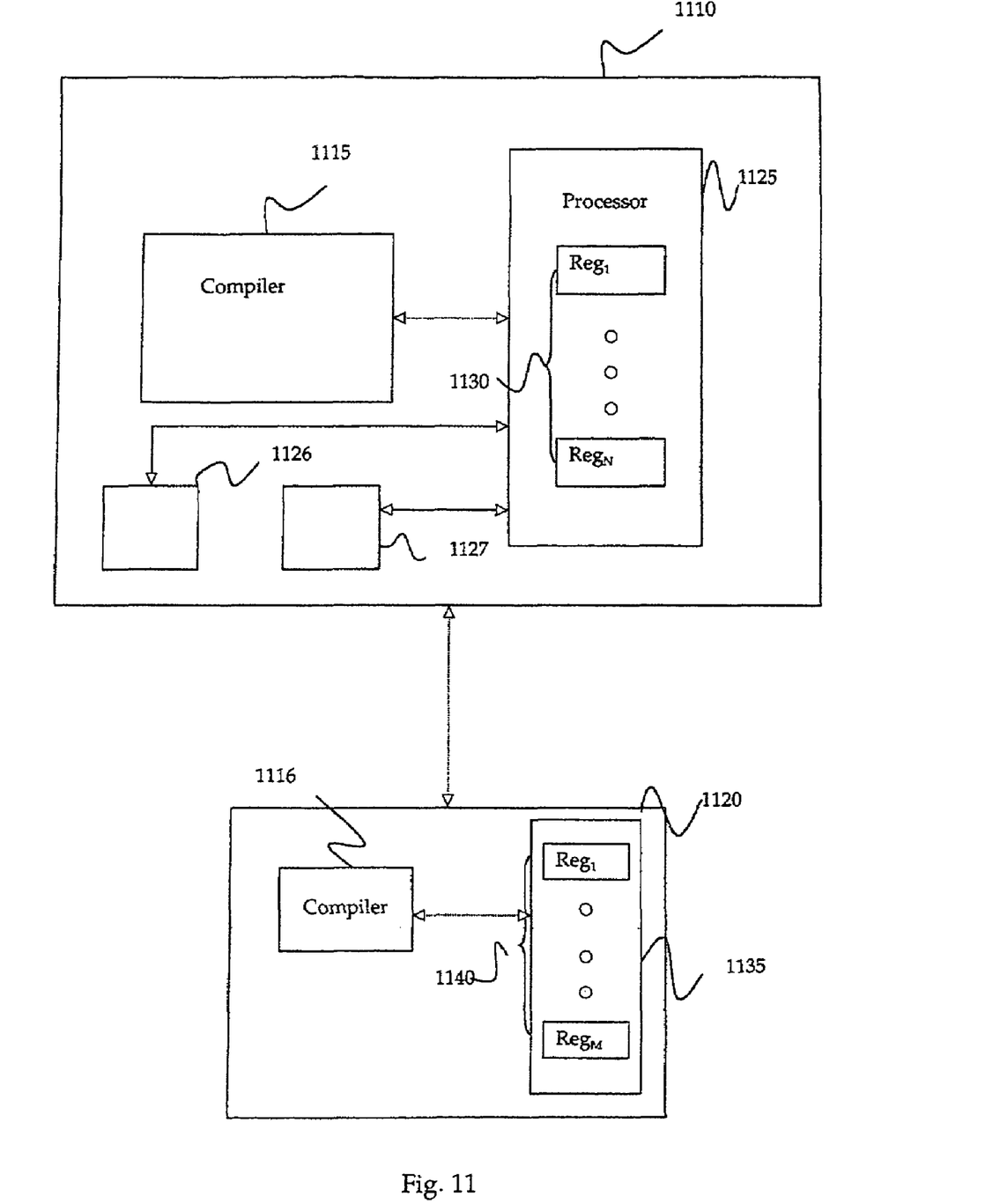
FIG. 11 illustrates a representative computer in conjunction with which embodiments may be practiced.

FIG. 11 illustrates a diagram of a representative host machine 1110 and target machine 1120 in conjunction with which embodiments may be practiced. It is noted that embodiments of the invention may be practiced on other electronic devices, including but not limited to, a set-top box connected to the Internet, notebook computers, personal digital assistants (PDAs), palm personal computers (PCs), notebooks, servers, workstations, etc. In one embodiment host machine 1110 and target machine 1120 are computer devices, such as a desktop personal computer (PC), server, workstation, etc. In one embodiment host machine 1110 is operatively coupled to a monitor, a user interface (e.g., a keyboard) and a pointing device (not shown). In another embodiment target machine 1120 is operatively coupled to monitor, user interface (e.g., a keyboard) and pointing device (not shown). Host machine 1110 includes at least one processor 1125 (e.g., one of a number of Intel® processors, such as Pentium®), local memory 1127, such as random-access memory (RAM), static random access memory (SRAM), dynamic random access memory (DRAM), synchronous DRAM (SDRAM), read-only memory (ROM), etc., and one or more storage devices 1127, such as a hard disk drive, a floppy disk drive (into which a floppy disk can be inserted), an optical disk drive, a tape cartridge drive, etc. The memory, hard drives, floppy disks, etc., are types of computer-readable media.

In one embodiment host machine 1110 includes compiler 1115 and register set 1130. In one embodiment, compiler 1115 is a computer program (i.e., a compiler program) that can reside on a secondary storage medium (e.g., a hard drive on a machine, RAM, etc.) and is executed on a processor, such as processor 1125. Those of ordinary skill in the art will appreciate that other components can be coupled to processors 1125 and 1135 (e.g., cache memory, local memory, memory controller, etc.), not shown in FIG. 11; only those parts necessary to describe the invention in an enabling manner are provided. In one embodiment, compiler 1115 runs on processor 1125 of host machine 1110, performs optimization, assigns register classes and creates compiled code. In one embodiment, the compiled code runs on target machine 1120 and not on host machine 1110. In another embodiment, compiled code created on host machine 1110 runs on host machine 1110. It should be noted that when compiled code is created on host machine 1110, it can run on other target machines (not shown) that have a different architecture than host machine 1110.

In one embodiment processor 1125 has a number of registers ($R_1$-$R_N$) in register set 1130. In this embodiment, N can be 1 or more. In one embodiment processor 1135 has a number of registers ($R_1$-$R_M$) in register set 1140. In this embodiment, M can be 1 or more. Compiler 1115 is a compiler that can execute in a processor in which a source program is inputted, causing the compiler to generate an executable program, as is well known in the art. Compiler 1115 can execute on a target machine such as target machine 1120 or a host machine, such as host machine 1110. It is important to appreciate that the embodiments are not limited to any particular type of source program, as the type of computer programming languages used to write the source program may vary from procedural code type languages to object oriented languages. In one embodiment, the executable program is a set of assembly code instructions, as is well known in the art.

The embodiments are not particularly limited to any type of host machine 1110 or target machines 1120. Residing on host machine 1110 is a computer readable medium storing a computer program that is executed on machine 1110 or target machine 1120. Compiler optimization is performed by the computer program in accordance with the embodiments. In one embodiment, target machine has compiler 1116. It should be noted that in other embodiments, compiler 1116 is not included or required. Compiler 1116 can be completely different from compiler 1115. In another embodiment, compiler 1115 and compiler 1116 can be similar or identical.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable storage medium includes read-only memory (ROM); random-access memory (RAM); magnetic disk storage media; optical storage media; flash memory devices; biological electrical, mechanical systems, etc.; a transmission medium includes electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising a machine-readable storage medium containing instructions which, when executed by a machine, cause the machine to perform operations comprising:
    assigning a first register class to at least one symbolic register in at least one instruction;
    assigning a second register class to the at least one symbolic register based at least in part on a linear conjunctive forward dataflow analysis that iterates a basic block of instructions in a compilation unit only once;
    moving existing register class fixups for the assignment of the second register class to a different location and removing unnecessary register class fixups, the moving and removing to reduce the register class fixups, wherein register class fixups are instructions inserted into a program in response to one or more register class assignment modifications; and
    renaming the at least one symbolic register,
    wherein each instruction includes assignment of one of the first register class assigned and the second register class assigned.

2. The apparatus of claim 1, said assigning the first register class instruction is an initial assignment.

3. The apparatus of claim 1, said assigning the second register class further including instructions which, when executed by a machine, cause the machine to perform operations including:
    marking a register class assignment map that operates to track register class assignments at a block entry of the compilation unit;
    marking a register class assignment map at a block exit of the compilation unit;
    determining a register class assignment map at an entry of an instruction in a block of the compilation unit; and
    determining register class assignment map at an exit of the instruction in the block of the compilation unit.

4. The apparatus of claim 1, said moving register class fixups comprises one or more of hoisting register class fixups and sinking the register class fixups.

5. The apparatus of claim 1, wherein said removing the register class fixups that are unnecessary comprises removing dead code.

6. A system comprising:
    a processor having at least one register; and
    a compiler coupled to the processor executing in a host device that inputs a source program having a plurality of operation blocks,
    wherein the compiler assigns a first register class in at least one instruction to the at least one symbolic register, and assigns a second register class to the at least one symbolic register through a linear conjunctive forward dataflow analysis that iterates a basic block of instructions in a compilation unit only once, moves register class fixup s for the assignment of the second register class to a different location and removes unnecessary register class fixups to reduce the register class fixups, and renames the at least one symbolic register, wherein each instruction includes assignment of one of the first register class assigned and the second register class assigned and wherein register class fixups are instructions inserted into a program in response to one or more register class assignment modifications.

7. The system of claim 6, wherein the first register class assigned is an initially assigned register class.

8. The system of claim 6, wherein the second register class assigned includes:
   marking a register class assignment map that operates to track register class assignments at a block entry of the compilation unit;
   marking a register class assignment map at a block exit of the compilation unit;
   determining a register class assignment map at an entry of an instruction in a block of the compilation unit; and
   determining a register class assignment map at an exit of the instruction in the block of the compilation unit.

9. The system of claim 6, said movement of register class fixups includes one or more of:
   hoisting register class fixups; and
   sinking the register class fixups.

10. The system of claim 6, said removing the register class fixups that are unnecessary includes removing dead code.

11. A computer comprising:
   at least one processor having at least one register coupled to a first memory and a second memory;
   at least one user input device coupled to the processor;
   a monitor coupled to the processor, and
   a compiler executing in the processor that inputs a source program having a plurality of operation blocks,
   wherein the compiler assigns a first register class in at least one instruction to the at least one symbolic register, and assigns a second register class to the at least one symbolic register through a linear conjunctive forward dataflow analysis that iterates a basic block of instructions in a compilation unit only once, moves register class fixups for the assignment of the second register class to a different location and removes unnecessary register class fixups to reduce the register class fixups, and renames the at least one symbolic register, wherein each instruction includes assignment of one of the first register class assigned and the second register class assigned and wherein register class fixups are instructions inserted into a program in response to one or more register class assignment modifications.

12. The computer of claim 11, wherein the first register class assigned is an initially assigned register class.

13. The computer of claim 11, wherein the second register class assigned includes:
   marking a register class assignment map that operates to track register class assignments at a block entry of the compilation unit;
   marking a register class assignment map at a block exit of the compilation unit;
   determining a register class assignment map at an entry of an instruction in a block of the compilation unit; and
   determining a register class assignment map at an exit of the instruction in the block of the compilation unit.

14. The computer of claim 11, said movement of register class fixups includes one or more of:
   hoisting register class fixups; and
   sinking the register class fixups.

15. The computer of claim 11, wherein said removing the register class fixups that are unnecessary includes removing dead code.

* * * * *

UNITED STATES PATENT AND TRADEMARK OFFICE
CERTIFICATE OF CORRECTION

PATENT NO. : 7,634,767 B2  Page 1 of 1
APPLICATION NO. : 10/813764
DATED : December 15, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Twenty-first Day of December, 2010

David J. Kappos
*Director of the United States Patent and Trademark Office*